United States Patent [19]

Koyanagi et al.

[11] Patent Number: 5,424,844
[45] Date of Patent: Jun. 13, 1995

[54] COPY MACHINE MANAGING SYSTEM AND FACSIMILE MACHINE USED THEREIN

[75] Inventors: Yuuji Koyanagi, Kawasaki; Tomokazu Mitsudome, Yokohama; Shogo Hyakutake, Zushi; Hiroshi Yokoyama, Matsudo; Shinichi Kudo, Yokohama, all of Japan

[73] Assignee: Ricoh Company, Ltd., Tokyo, Japan

[21] Appl. No.: 26,026

[22] Filed: Mar. 4, 1993

[30] Foreign Application Priority Data

Mar. 13, 1992 [JP] Japan .................. 4-054043
May 27, 1992 [JP] Japan .................. 4-134786
Jan. 7, 1993 [JP] Japan .................. 5-000950

[51] Int. Cl.⁶ .................................. H04N 1/21
[52] U.S. Cl. ........................................ 358/296
[58] Field of Search ............... 358/296, 300, 302

[56] References Cited

U.S. PATENT DOCUMENTS 4,864,417 9/1989 Watanabe et al. .
5,077,582 12/1991 Kravette et al. .
5,091,747 2/1992 Tsai .

FOREIGN PATENT DOCUMENTS 56-27161 3/1981 Japan .
59-91456 5/1984 Japan .
59-91569 5/1984 Japan .
59-142559 8/1984 Japan .
3-66258 3/1991 Japan .

OTHER PUBLICATIONS

Patent Abstracts of Japan, vol. 13, No. 97, (E-723), Mar. 7, 1989, JP-A-63 269 665, Nov. 7, 1988.
Patent Abstracts of Japan, vol. 8, No. 208, (p-302), Sep. 21, 1984, JP-A-59 091 569, May 26, 1984.
Patent Abstracts of Japan, vol. 8, No. 275, (p-321), Dec. 15, 1984, JP-A-59 142 559, Aug. 15, 1984.
Patent Abstracts of Japan, vol. 10, No. 8, (E-373), Jan. 14, 1986, JP-A-60 171 857, Sep. 5, 1985.
Patent Abstracts of Japan, vol. 13, No. 97, (E-723), Mar. 7, 1989, JP-A-63 269 664, Nov. 7, 1988.
Patent Abstracts of Japan, vol. 13, No. 97, (E-723), Mar. 7, 1989, JP-A-63 269 663, Nov. 7, 1988.
Patent Abstracts of Japan, vol. 8, No. 208, (p-302), Sep. 21, 1984, JP-A-59 091 456, May 26, 1984.

*Primary Examiner*—Mark J. Reinhart
*Attorney, Agent, or Firm*—Oblon, Spivak, McClelland, Maier, & Neustadt

[57] ABSTRACT

A copy machine managing system comprises at least one copy machine provided with a collecting unit for collecting and storing management information and a transferring unit for transferring the management information to an external unit, the management information being used for managing the copy machine, a facsimile machine connected with the copy machine so as to establish a local area network, the facsimile machine collecting the management information of the copy machine via the local area network, and a managing unit connected with the facsimile machine via a public service telephone line. The managing unit receives the management information from the facsimile machine via the public service telephone line so it can manage the copy machine by using the management information. The management information is converted into a facsimile communication signal by the facsimile machine so that the management information can be transmitted via the public service telephone line.

12 Claims, 14 Drawing Sheets

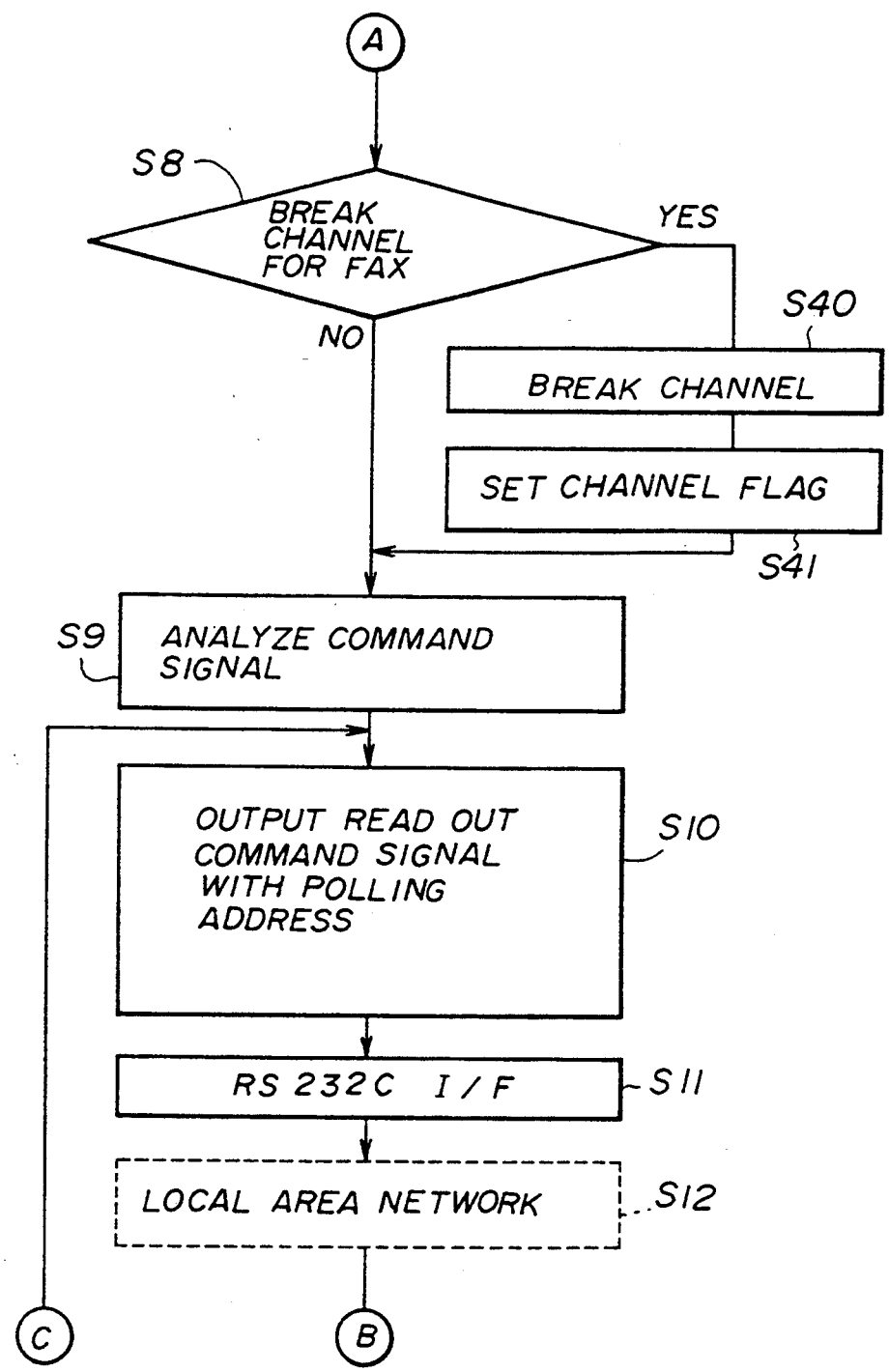

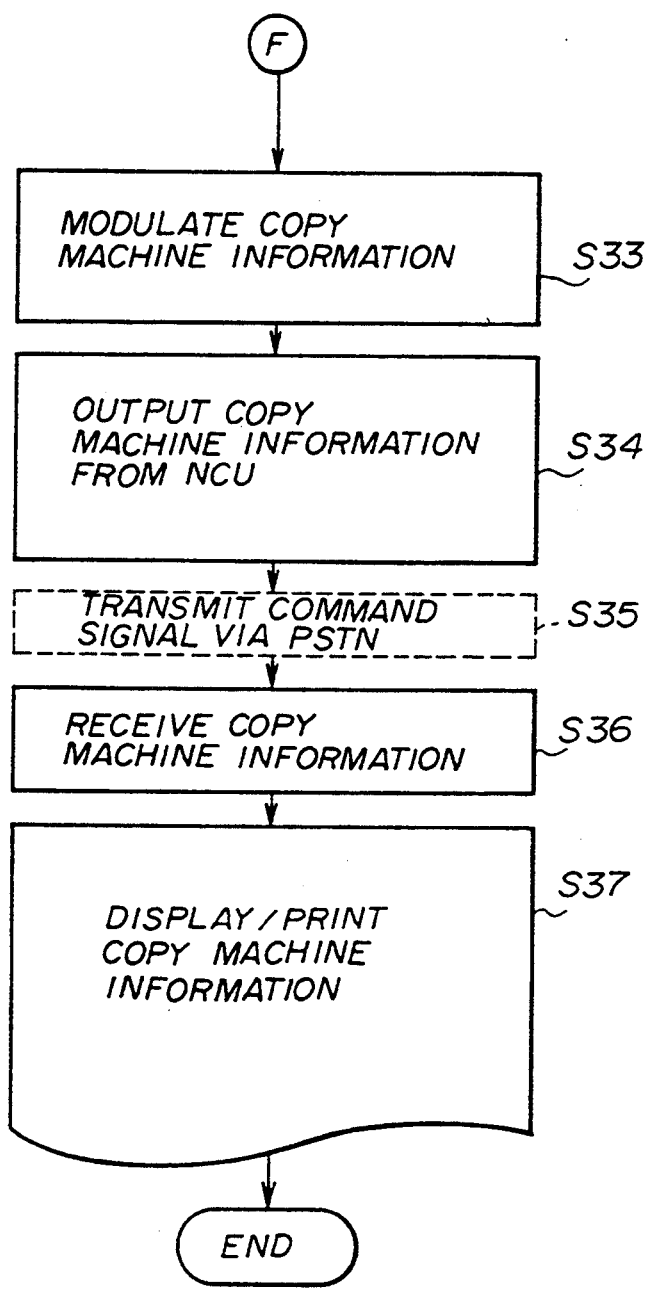

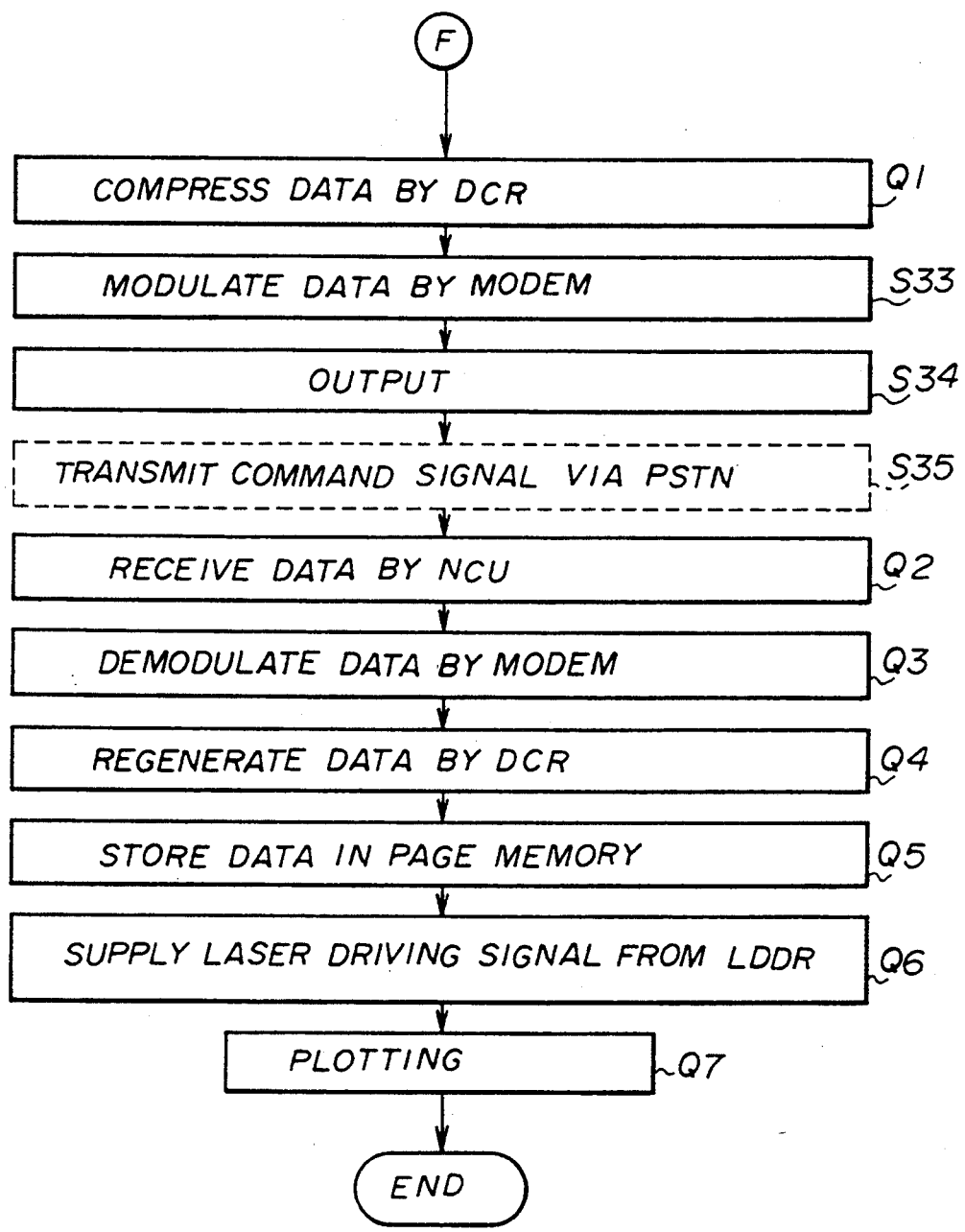

COPY MACHINE MANAGING SYSTEM AND FACSIMILE MACHINE USED THEREIN

BACKGROUND OF THE INVENTION

The present invention generally relates to a copy machine managing system by which a centralized management of one or a plurality of copy machines can be performed, and more particularly to a copy machine managing system, including a facsimile machine, by which a copy machine can be managed from a remote location.

Conventionally, many copy-machine managing systems are used which perform a centralized management of a plurality of copy machines by connecting the copy machines to at least one managing apparatus via a local area network. An example of such conventional systems is suggested, for example, in Japanese Laid-Open Patent Applications No. 59-142559, No. 59-91569, or No. 59-91456.

The structure of the copy machine managing system suggested in the above-mentioned Patent Application is shown in FIG. 1. Each of a plurality of copy machines 11 is provided with an information collecting unit 12. A central managing unit 13 is connected with each of the information collecting units 12 so as to establish a local area network (LAN) 14.

Each of the information collecting units 12 collects information used for management of the copy machines from corresponding copy machine 11 and stores the information therein. The information is then transferred to the central managing unit 13. The central managing unit 13 receives the information, and manages the plurality of copy machines 11 in accordance with the information.

For example, each of the information collecting units 12, one of which, as mentioned above, is provided for each of the copy machines 11, collects and stores data of the number of copy operations performed by each user section and sends the data to the central managing unit 13. The central managing unit 13 stores the data of each copy machine and of each user section. The data is then processed so as to obtain the number of copy operations performed by each copy machine or by each user section, and the number is displayed or printed out when it is requested. The information collection unit 12 may collect and send information data used for performing various maintenance service activities, such as eliminating a paper jam or a malfunction, to the central managing unit 13 so that the central managing unit 13 can process the data for display or print out the results.

According to this copy machine managing system, the number of copy operations performed by each copy machine and the occurrence of any malfunction can be accurately monitored. Thus, a plurality of copy machines can be centrally managed and the data is used for performing various maintenance service activities.

In the above-mentioned conventional copy machine managing system, in the case where the copy machines 11 and the central managing unit 13 are located in a relatively narrow area, such as in the same building, the local area network 14 can be established by providing new connection lines or by utilizing local lines already provided at the site.

However, when the copy machines 11 and the central managing unit 13 are separated by a long distance, for example, in the case where the central managing unit 13 is located in a main office and the copy machines 11 are located in a branch office, the local area network 14 must be established by utilizing an exclusive communication line or a public service telephone line. When utilizing an exclusive communication line, an expenditure for installing the new line or renting the exclusive communication line will be required. Since a communication line does not have to be connected to copy machines, the cost for the exclusive communication line is an extra unnecessary expenditure.

Additionally, for example, in the case where a copy machine distributor manages copy machines at a plurality of users of the maintenance service, the central managing unit 13 is usually located at a service center of the distributor, and thus a connection between the central managing unit 13 and each copy machine at the user has to rely on a public service telephone line. However, to use a public service communication line, an initial fee and monthly fee are required. A basic fee included in the monthly fee must be paid regardless of the actual use of the line.

As mentioned above, since copy machines do not have to be connected with a communication line, the extra cost for the communication line is an extra unnecessary expenditure for the user of the copy machine or the service center of the distributor.

SUMMARY OF THE INVENTION

It is a general object of the present invention to provide an improved and useful copy machine managing system in which the above-mentioned disadvantages are eliminated.

A more specific object of the present invention is to provide a copy machine managing system for which the communication costs are less than that of the conventional system due to the utilizing of a facsimile machine.

Another object of the present invention is to provide a facsimile machine which can be used in a copy machine managing system and which can send data collected from a copy machine to a central managing unit located at a remote location at a minimum cost.

In order to achieve the above-mentioned objects, a copy machine managing system is provided which comprises:

at least one copy machine provided with a collecting unit for collecting and storing management information and a transferring unit for transferring the management information to an external unit, the management information being used for managing the copy machine;

a facsimile machine connected with the copy machine so as to establish a local area network, the facsimile machine collecting the management information of the copy machine via the local area network; and a managing unit connected with the facsimile machine via a public service telephone line, the managing unit receiving the management information from the facsimile machine via the public service telephone line so it can manage the copy machine by using the management information, the management information being converted into facsimile communication signals by the facsimile machine so that the management information can be transmitted via the public service telephone line.

To achieve the above-mentioned objects, the following is also provided. A facsimile machine according to the present invention which is used in a copy machine management system comprising at least one copy machine provided with a collecting unit for collecting and storing management information and a transferring unit for transferring the management information to an external unit, the management information being used for managing the copy machine, the copy machine managing system further comprising a managing unit connected with the facsimile machine via a public service telephone line, the managing unit receiving the management information from the facsimile machine via the public service telephone line so it can manage the copy machine by using the management information, the facsimile machine being connected with the copy machine so as to establish a local area network and collect the management information of the copy machine via the local area network, the facsimile machine comprising:

a read out unit for reading out the management information from the transferring unit, a read out operation being performed automatically or upon request by an operator;

a memory unit for storing the management information at an address corresponding to each of the copy machines;

a signal converting unit for converting the management information into facsimile communication signals; and a transmitting unit for transmitting the management information via the public service telephone line.

According to the present invention, copy machine information can be transferred to a managing unit located at remote place via a public service telephone line by connecting the copy machine to a facsimile machine. Thus communication costs for transferring the copy machine information are minimized.

Other objects, features, and advantages of the present invention will become more apparent from the following detailed description when read in conjunction with the accompanying drawings.

BRIEF DESCRIPTION OF THE DRAWINGS

FIGS. 8A-8E show a flow chart of an operation performed by the second embodiment of the copy machine managing system according to the present invention;

FIGS. 10A and 10B show a flow chart of an operation performed in another variation of the second embodiment.

DETAILED DESCRIPTION OF THE PREFERRED EMBODIMENTS

Figure 1:
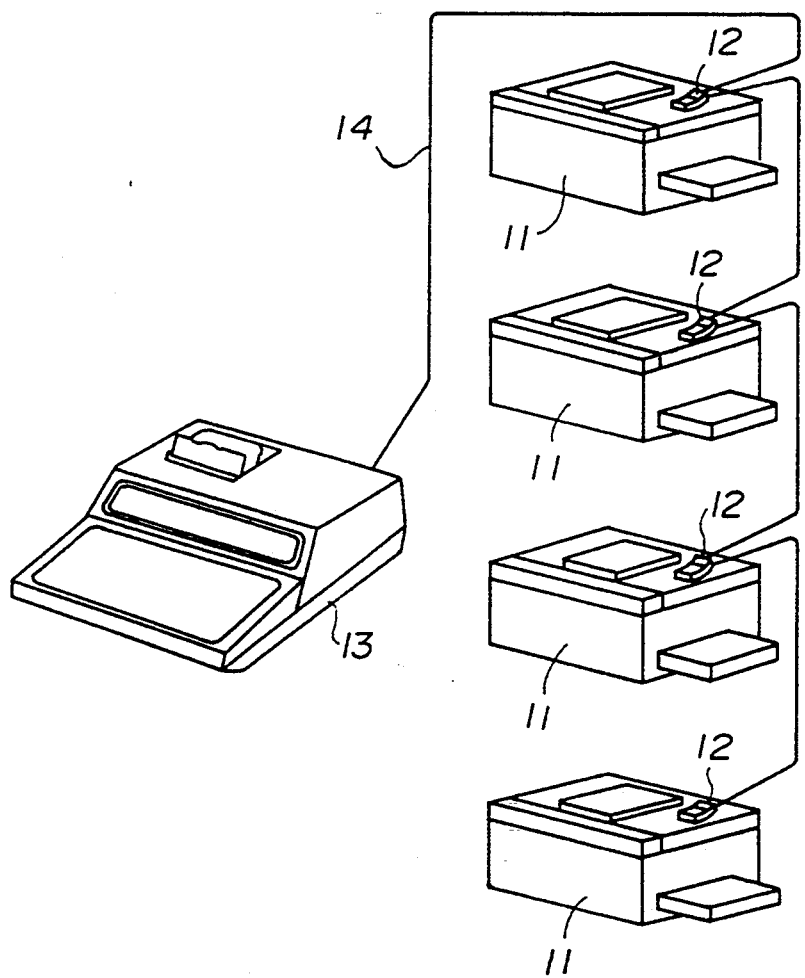
FIG. 1 is an illustration for explaining a structure of a conventional copy-machine managing system.
Figure 2:
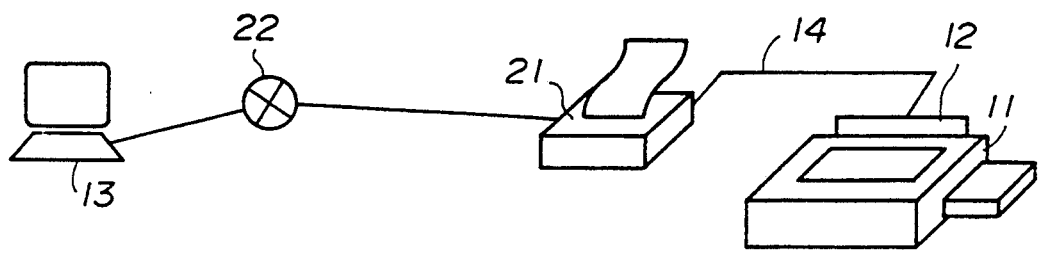
FIG. 2 is an illustration of a first embodiment of a copy machine managing system according to the present invention.
Figure 3:
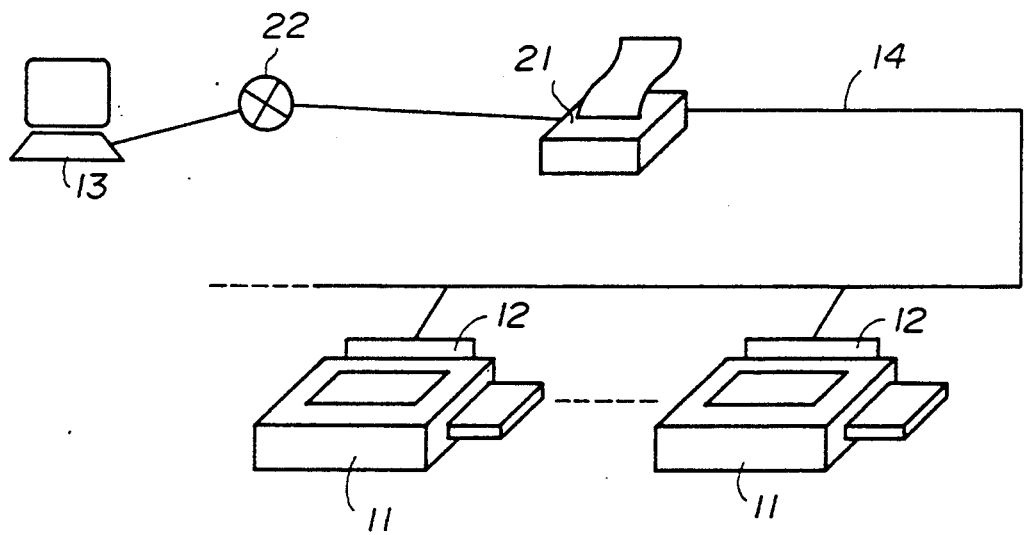
FIG. 3 is an illustration of a second embodiment of the copy machine managing system according to the present invention.

FIG. 2 is an illustration of a first embodiment of a copy machine managing system according to the present invention. FIG. 3 is an illustration of a second embodiment of the copy machine managing system according to the present invention. In a construction shown in FIG. 2, a facsimile machine is provided for each copy machine. FIG. 3 shows a construction where one facsimile machine is connected to a plurality of copy machines. In FIGS. 2 and 3, parts that are the same as the parts shown in FIG. 1 are given the same reference numerals, and descriptions thereof will be omitted.

A facsimile machine 21 is connected to a single copy machine as shown in FIG. 2 or is connected to a plurality of copy machines as shown in FIG. 3 so as to establish a local area network 14. The facsimile machine 21 is also connected to a central managing unit 13 via a public service telephone line 22. Information used for managing the copy machine 11 stored in the information collecting unit 12 is sent to the central managing unit 13 via the public service telephone line 22 after the information is converted into facsimile signals by the facsimile machine 21.

The central managing unit 13 comprises, for example, a personal computer provided with an interface card for facsimile communication. The central managing unit 13 sends a command signal to the facsimile machine 21 requiring that management information of the copy machine 11 be transferred in accordance with a facsimile communication procedure.

The facsimile machine 21 has additional elements such as an interface circuit which reads out management information from the copy machine 11 and a procedure program for transferring the management information in accordance with the facsimile communication procedure established between the facsimile machine 21 and the central managing unit 13.

The copy machine 11 transfers its own management information via an interface, that is the information collecting unit 12, connected with the facsimile machine 21. The information collecting unit 12 may be incorporated into the copy machine 11 or may be attached to the copy machine 11.

A description will now be given of an operation of the first embodiment of the copy machine managing system shown in FIG. 2. The operation described below concerns a case where the management information is displayed on the central managing unit 13.

First, an operator of the central managing unit 13 inputs, in accordance with an application program, a desired dial-number of the facsimile machine 21 and a desired operation to be performed by the facsimile machine 21. In this case, the operation is for reading out management information of the copy machine 11. By this input, the central managing unit 13 calls the designated facsimile machine 21 via the public service telephone line 22. The facsimile machine 21 then sends back a response signal to the central managing unit 13 in accordance with a particular communication procedure, for example CCITT.T30. By this communication procedure, signals such as called station identification (CED) and non-standard facilities (NSF) signals are sent back to the central managing unit 13. The central managing unit is provided with an interface card for the facsimile communication so it can recognize the CED and NSF signals.

After receiving these signals, the central managing unit 13 sends a non-standard facilities set-up (NSS) signal to the facsimile machine 21 in accordance with the CCITT facsimile communication procedure. The NSS signal consists of a high level data link control procedure (HDLC) frame and includes in a field thereof a designated operation input by the operator as command information. Accordingly, the central managing unit 13 sends some command signals to the facsimile machine 21 by the facsimile communication procedure. After receiving the command signals, the facsimile machine 21 accesses the copy machine 11 so as to read out the management information thereof. It should be noted that the channel established by using the public service telephone line 22 may be maintained in an active condition or may be broken in consideration of a time lag due to the reading out of the management information of the copy machine 11.

The facsimile machine 21, which has received the above-mentioned command signals, analyzes the command signals and performs operations in accordance with the commands. For example, in this case, the facsimile machine 21 reads the management information of the copy machine 11 by communicating with the copy machine 11. The facsimile machine 21 and the copy machine 11 are connected via the information collecting unit 12 by using, for example, a RS232C or RS422 interface with a four-line type or a two-line type communication line.

Once the above-mentioned connection is established, the facsimile machine 21 sends a control signal to the copy machine 11 so as to access the information collecting unit 12. A linkage is established between the facsimile machine 21 and the copy machine 11 in accordance with a known procedure for a personal computer communication, and command or data signals are transmitted/received. That is, the information collecting unit 12 sends the management information of the copy machine 11 to the facsimile machine 21 when the facsimile machine 21 sends a read out command to the information collecting unit 12.

The management information sent to the facsimile machine 21 is stored in a memory in the facsimile machine 21. When the communication channel between the central managing unit 13 and the facsimile machine is still open, the management information is sent to the central managing unit 13 in accordance with the facsimile communication procedure. In the case where the channel has been broken, the facsimile machine 21 calls the central managing unit 13 in accordance with a program stored in the facsimile machine 21, and the management information is then sent to the central managing unit 13 in accordance with the facsimile communication procedure. Alternatively, the central managing unit 13 calls, when the operator of the central managing unit 13 gives an instruction, the facsimile machine 21 after a predetermined period of time has elapsed so that a read out of the management information stored in the facsimile machine 21 is performed in accordance with the facsimile communication procedure.

The management information of the copy machine 11 which is read out from the facsimile machine 21 is stored in a predetermined area of a memory in the central managing unit 13, and upon request, the management information is displayed or printed out by the central managing unit 13.

Next, a description will be given of an operation performed by a second embodiment of the copy machine managing system shown in FIG. 3.

In the system shown in FIG. 3, the central managing unit 13 reads out the respective management information items of the copy machines 11 from the facsimile machine 21, by establishing a local area network 14 which connects a plurality of the copy machines 11 and the facsimile machine 21. Similarly to the above-mentioned system shown in FIG. 2, command and data signals are transmitted/received in accordance with the facsimile communication procedure.

The difference between the first embodiment and the second embodiment is that a plurality of copy machines are provided in the second embodiment while only a single copy machine is provided in the first embodiment. In the second embodiment, the facsimile machine 21 must individually access each of the copy machines 11 so as to read out the management information of each of the copy machines 11. In order to perform such an operation, the facsimile machine 21 is connected to each of the copy machines 11 by a known multi-drop type connection and then performs a communication in accordance with a basic data-control procedure. For example, the facsimile machine sends data accompanied by a polling address; only when the polling address corresponds to a particular address stored in each copy machine 11 does the information collecting unit 12 respond to a read out signal by sending the management information of the copy machine.

The management information is stored in a predetermined memory area assigned to each copy machine 11. The management information is sent to the central managing unit 13 by an operation similar to that described in the first embodiment described above.

Additionally, when a malfunction occurs in one of the copy machines 11, the malfunctioning copy machine 11 can by itself notify the facsimile machine 21 about the malfunction. In this case, a malfunction signal is sent to the local area network 14 and the facsimile machine 21 then detects the malfunction signal. After this, the facsimile machine establishes a linkage with the malfunctioning copy machine in accordance with a polling address of a known basic data-control procedure, and the copy machine sends data with regard to the details of its malfunction. It should be noted that the malfunction information may be transmitted when the malfunction occurs or when the copy machine is in a normal condition again after the malfunction has been corrected.

As mentioned above, in the first and the second embodiments, the management information of the copy machine 11 is converted into facsimile signals and the signals are sent, by the facsimile machine 21, to the central managing unit 13 via the public service telephone line 22. Thus, management information can be sent to a central managing unit located in a remote place at a minimum cost. That is, by providing a facsimile machine between the copy machine 11 and the central managing unit 13, which facsimile machine is originally used for performing communication between remote terminals, the central managing unit 13 can be located in a remote place. Accordingly, centralized control of copy machines located over a wide domestic or international area can be realized.

Additionally, since the only communication expenditure needed is when there is a communication between the central managing unit 13 and the facsimile machine 21, a management and malfunction diagnosis of the copy machine can be performed at a minimum cost as compared to the conventional system in which an exclusive communication line or a public service telephone line is connected directly to the copy machine 11.

Figure 4:
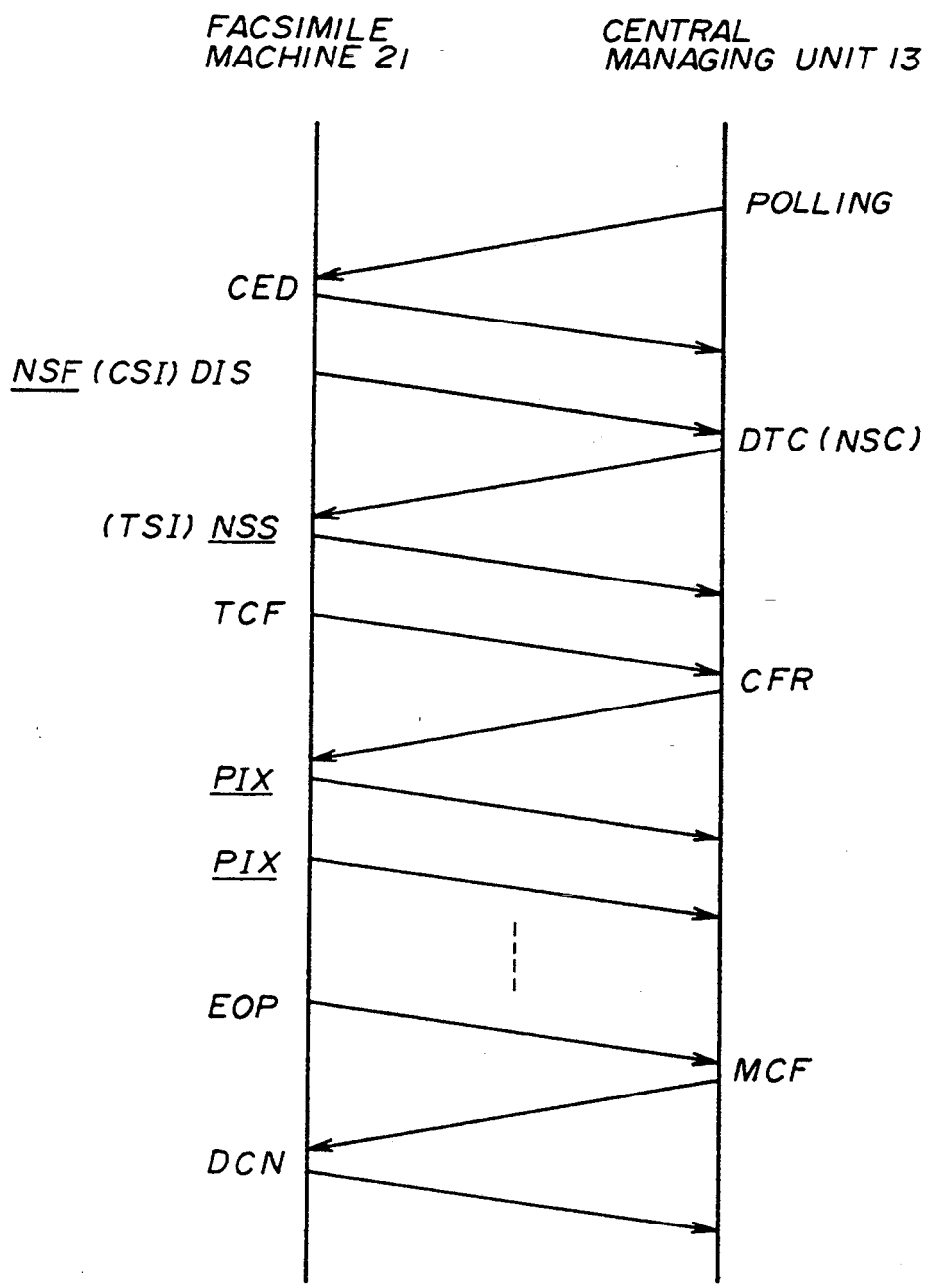
FIG. 4 is an illustration for explaining a protocol used in a facsimile communication procedure.

Next, a description will be given, with reference to FIG. 4, of a communication procedure used by the facsimile machine provided in the copy machine managing system according to the present invention. FIG. 4 is an illustration for explaining a protocol used in a facsimile communication procedure.

When a request for polling is sent from the central managing unit 13 to the facsimile machine 21, the facsimile machine 21 sends back a called station identification (CED) signal to the central managing unit 13 and then sends a non-standard facilities (NSF) signal (or a called subscriber identification (CSI) signal) and a digital identification signal (IDS). In response to these signals, the central managing unit 13 sends a digital transmit command (DTC) signal or non-standard facilities command (NSC) signal to the facsimile machine 21. Then the facsimile machine 21 sends a non-standard facilities set-up (NSS) signal or transmitting subscriber identification (TSI) signal and then a training check (TCF) signal. After the coordination of the transmitting speed is checked, the central managing unit 13 sends a confirmation to receiver (CFR) signal to the facsimile machine 21 and then the central managing unit 13 receives image signals PIX. When all the information signals have been sent, the facsimile machine 21 sends an end of procedures (EOP) signal to the central managing unit 13. Then the central managing unit 13 sends a message confirmation (MCF) signal to the facsimile machine 21, and upon reception of the MCF signal, the facsimile machine 21 breaks the channel by a disconnect (DCN) signal, and the polling transmission ends.

The management information of the copy machine may be converted into the image signals PIX. Since the image signal PIX is standardized, for example, by G2 or G3, the central managing unit can be replaced by a facsimile machine if the data is not required for processing.

The management information of the copy machine 11 may also be converted into the NSF signal or the NSS signal so as to be transferred via a facsimile communication. Since the NSF signal or the NSS signal is allowed to have an original data format, the management information can be very effectively converted into data signals. Additionally, since the NSF signal or the NSS signal is a protocol that is performed before transmission of the image signals PIX, the image signals PIX can be omitted in order to reduce a communication time.

Figure 5:
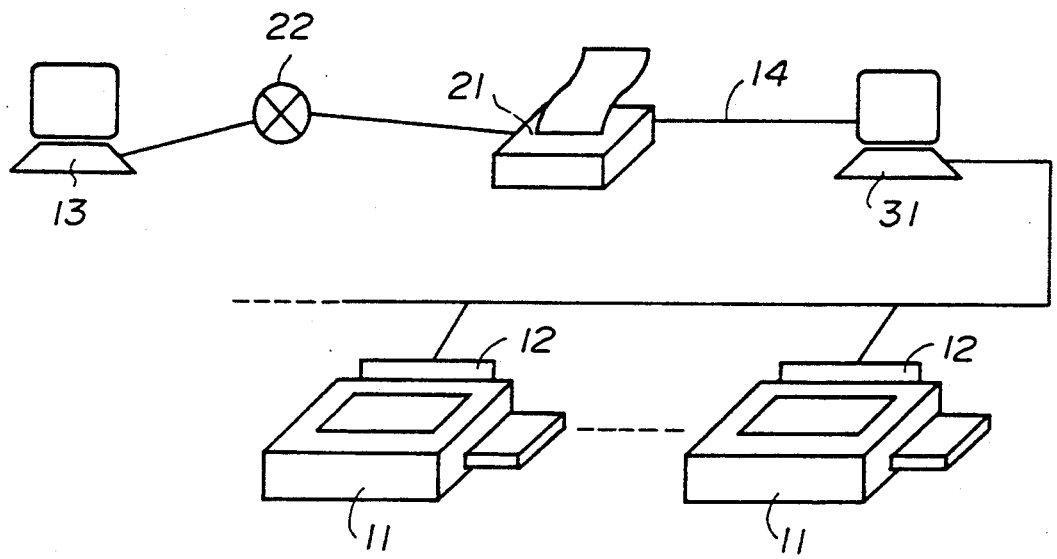
FIG. 5 is an illustration of a third embodiment of the copy machine managing system according to the present invention.

Next, a description will be given of a third embodiment of the copy machine managing system according to the present invention. FIG. 5 is an illustration of the third embodiment of a copy machine managing system according to the present invention. In FIG. 5, parts that are the same as the parts shown in FIG. 3 are given the same reference numerals, and descriptions thereof will be omitted.

In FIG. 5, a local managing unit 31 included in the local area network 14 is connected between the facsimile machine 21 and a plurality of the copy machines 11. The local managing unit 31 locally manages the plurality of the copy machines provided in the local area network 14. Management information of each of the copy machines 11 is collected in the local managing unit 31 and the collected information is sent to the central managing unit 13 via the facsimile machine 21 and the public service telephone line 22 connected to the facsimile machine 21.

The present embodiment is considered to be similar to the system shown in FIG. 1 except that the facsimile machine 21, the public service telephone line 22, and the central managing unit 13 have been added thereto. In the present embodiment, the management information of the copy machine 11 is temporarily stored in the local managing unit 31. The reading out operation performed by the central managing unit 13 is directed against the local managing unit 31 via the facsimile machine 21. Due to the provision of the local managing unit, copy machines located in a local area can be managed separately from the central managing unit 13.

Figure 6:
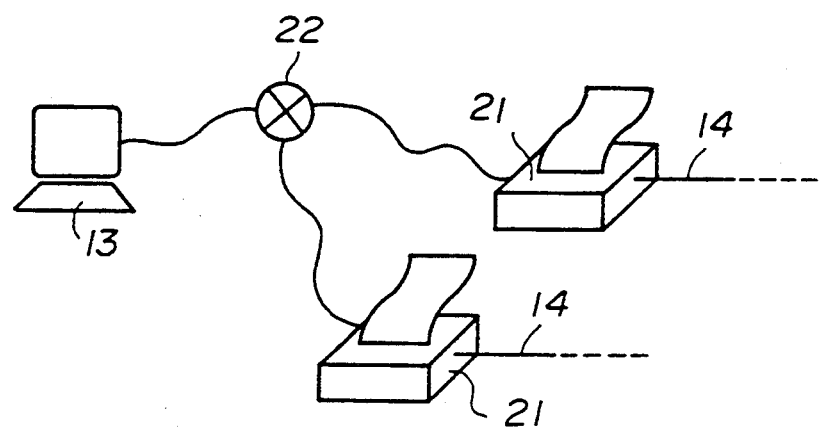
FIG. 6 is an illustration of a variation of the third embodiment.

FIG. 6 is an illustration for explaining a variation of the third embodiment according to the present invention. In FIG. 6, parts that are the same as the parts shown in FIG. 5 are given the same reference numerals, and the descriptions thereof will be omitted. This variation comprises the central managing unit 13 and a plurality of the facsimile machines 21. The central managing unit 13 is connected with each of the facsimile machines 21 via the public service telephone line 22. Similar to the third embodiment shown in FIG. 5, each of the facsimile machine 21 is connected with a plurality of the copy machines 11 via the local area network 14.

The central managing unit 13 located in a service center or a distributor can access a plurality of the facsimile machines 21, that is a plurality of users, via the public service telephone line. Accordingly, the service center or the distributor can collect and manage a number of copies performed, maintenance information or maintenance history by each copy machine 11, which information is useful for service and sales activities.

Figure 7:
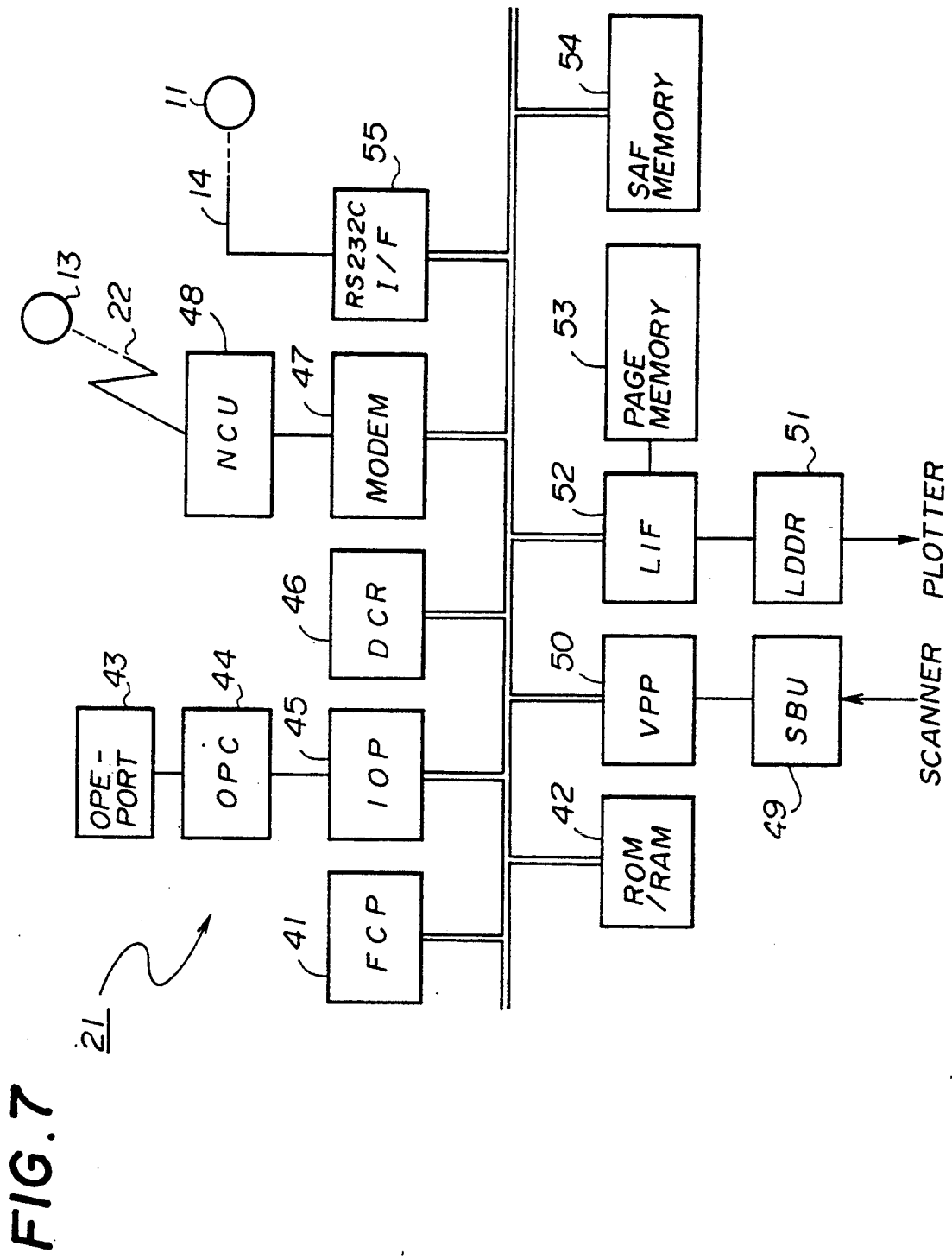
FIG. 7 is a block diagram of a facsimile machine used in the copy machine managing system according to the present invention.

Next a description will be given, with reference to FIG. 7, of the facsimile machine used in the above mentioned embodiments of the copy machine managing system according to the present invention. FIG. 7 is a block diagram of the facsimile machine.

In FIG. 7, FCP 41, serving as a facsimile controlling processor, is an LSI integrated with a CPU, a bus controller, a Direct Memory Access (DMA) controller, and a timer. A ROM/RAM 42 is a memory for data which includes a ROM for storing programs for a facsimile control and a RAM portion which is used as a buffer memory for image processing.

An ope-port 43 is a display including keys for inputting operations and an LCD/LED for display. An OPC 44 is an LSI for controlling ope-port 43 which detects an input by the ope-port 43 and controls a display on the LCD/LED. An IOP 45 is an I/O port LSI for controlling mechanical parts. The IOP 45 is provided as an interface for the OPC 44, and the IOP 45 also interfaces input signals by a sensor and input/output signals for motor control, such as a motor provided in a scanner or a plotter.

A DCR 46 is an LSI for compressing or reproducing image information. A modem 47, comprising an LSI for modulation and demodulation, performs a facsimile communication. A network controlling unit (NCU) 48 is an interface unit for interfacing between the modem 48 and the public service telephone line 22. The NCU 48 is connected to the central managing unit 13 via the public service telephone line 22.

An SBU 49, comprising a CCD sensor unit, scans an original copy. A VPP 51, comprising an LSI, binarizes image data scanned by the SBU 49 in a scanner.

An LDDR 51, comprising an LSI, controls on/off of a laser in a laser beam printer not shown in the figure. An LIF 52, comprising an LSI, controls a laser recording timing. A page memory 53 stores binary data of image information for laser recording. An SAF memory is a memory for storing image information to be transmitted or received by the facsimile machine. AN RS232C I/F 55 interfaces between the facsimile and an external unit. In the present embodiment, the RS232C I/F 55 is connected to the copy machine 11 (information collecting unit 12) via the local area network 14.

In the above-mentioned embodiment, the management information is read out from the information collecting unit 12 and is input to the facsimile machine through the RS232C I/F 55. The read out operation is started automatically or manually by an operator. The management information input to the facsimile machine 21 is stored in a predetermined area corresponding to each copy machine 11 in the ROM/RAM 42. The management information is, upon request, transferred to the central managing unit 13 via the modem 47, the NCU 48 and the public service telephone line 22.

Additionally, the management information stored in the ROM/RAM 42 is displayed on the LCD of the ope-port 43 or on an external displaying apparatus. The management information may be printed out by means of a plotter. In this case, the management information is first stored in the page memory 53 and then output to the plotter via the LIF 52 and the LDDR 51.

A program for setting a parameter in the software of the copy machine 11 is also stored in the ROM/RAM 42. The program is started, upon a request by the ope-port 43, and the parameter is transferred from the ope-port 43 to the copy machine 11 (information collection unit 12) via the RS232C I/F 55.

Next, a description will be given of functions performed by the facsimile machine 21. The facsimile machine 21 performs the following functions. It should be noted that the local area network mentioned below includes a bus type, a ring type, and a star type connection having a facsimile machine in the center of the star.

(a) Function for Read Out and Registration of Management Information

Reading out the following management information (1) and (2) via the local area network 14 by accessing the copy machine 11 (information collecting unit 12) in accordance with control information transmitted by the facsimile machine 21. The management information (1) and (2) is then registered in the ROM/RAM 42. The management information of the copy machine 11 is collected and stored in the information collecting unit 12.

Management information (1): A number of copies made by one user or by each section, and setting values of parameters. Each section includes a company, a department or a section of the company, a group, and an individual that need to be managed.

Management information (2): Maintenance information indicating operational conditions of the machine such as the occurrence of a paper jam or a malfunction by every divided portion of the machine, and setting values of parameters.

(b) Parameter Setting Function

Setting parameters in software of the copy machine 11 by transferring the following parameters (1) and (2) to the copy machine 11 (information collecting unit 12) via the local area network 14. The parameters (1) and (2) are input from the central managing unit 13 via the ope-port 43, and stored in the ROM/RAM 42.

Parameter (1): A maintenance parameter for controlling an operation of the copy machine 11. By adding or changing this parameter, some malfunctions in the copy machine 11 may be corrected.

Parameter (2): A user service parameter for controlling services offered to users. By adding, changing, or deleting this parameter, the services for a user can be changed, for example, use of the copy machine 11 can be limited in accordance with a password or an ID code assigned to each user. In order to provide such services, a parameter such as a password or an ID code has to be registered in the copy machine 11. The facsimile machine 21 stores the password or the ID code as a parameter and transfers the parameter to the copy machine 11 so that the parameter is set in a program of the copy machine 11. By this operation, the services for a user can be varied by the central managing unit 13. It should be noted that the parameter can be transferred to the copy machine 11 by an operator operating the facsimile machine. Further, the parameter may be read out as management information.

The following is a list of specific parameters included in the management information (1) and (2), and the above-mentioned parameters (1) and (2).

[1] service mode parameter : a parameter mainly needed for maintenance service for the copy machine 11, such as;

the number of copies or the number of paper jams counted in regard to each paper size, the number of copies or the number of paper jams counted in regard to each paper tray, the number of paper jams counted every day or every week, the number of paper jams in each copy machine, each adjustment value (a power-pack output, resist adjustment, sensor adjustment), clear of counter value,such as for paper jams, and priority setting values for a tray.

[2]user parameter: a parameter, used in an operation, mainly set by a user of the copy machine, such as;

a reset time for the number of copies or an image intensity that is previously set, a specially assigned tray number, a user code for identifying each user, a time setting value for on/off of a timer provided on the copy machine 11 for automatic on/off of the power of the copy machine, and the number of copies or the number of paper jams counted in regard to each user code.

[3]status parameter: a parameter, indicating current conditions of the copy machine, mainly used for recognizing conditions of the copy machine when the maintenance service accesses the copy machine, examples of such conditions being:

whether or not a paper jam has occurred, location of a paper jam, and whether or not the copy machine is operating.

(c) Displaying and Printing Functions

Outputting the management information stored in the facsimile machine 21, by means of the above mentioned function (a), automatically or by a user's operation. The outputting is performed by the recording means provided in the facsimile machine 21. The automatic outputting means a periodical reporting at each predetermined time such as a monthly reporting.

(d) Displaying and Printing Functions

Outputting the parameters stored in the facsimile machine 21, by means of the above mentioned function (b), automatically or by a user's operation.

(e) Function for Automatic Read Out of The Management Information

In the above-mentioned function (a), the management information of the copy machine 11 is automatically read out by accessing the copy machine 11 periodically, for example daily, weekly or monthly. The read out operation can be performed any time by a user's operation.

Further, the facsimile machine 21, connected with the central managing unit 13 via the public service telephone line 22, has the following functions (A), (B) and (C).

(A) Function for Read Out of The Management Information Upon Request by The Central Managing Unit The facsimile machine 21 accesses the copy machine 11 (information collecting unit 12) upon reception of control information sent by the central managing unit 13 so as to perform the above-mentioned function (a).

(B) Function for Transferring The Management Information Directing The Central Managing Unit The facsimile machine 21, without receiving a request by the central managing unit 13, automatically transfers the management information of the copy machine to the central managing unit 13. For example, when read out of the management information is requested by means of the function (A) or when the facsimile machine 21 reads out the management information by itself, the management information is transferred automatically after the read out. The facsimile machine 21 also transfers the management information upon a request being made by the central managing unit 13.

(C) Function For Setting The Parameters Upon Request by The Central Managing Unit The facsimile machine 21 accesses to the copy machine 11 (information collecting unit 12) upon reception of control information (signal for setting the parameters) sent by the central managing unit 13 so as to perform the above-mentioned function (b).

In the above-mentioned embodiments, many copy machines can be connected to the central managing unit by using one or more facsimile machines, which are widely used in offices in the United States or Japan; thus the costs for constructing the connection line between each of the copy machines and the central managing unit is minimized. Additionally, since a facsimile machine and a copy machine are usually placed in the same area in the office, a connection between the facsimile machine and the copy machine can be easily established in many cases. Further, since the central managing unit is connected with the facsimile machine via a public service telephone line, easy access to each copy machine is realized and communication costs are minimized.

Next, a description will be given, with reference to FIGS. 8A to 8E, of an operation of the second embodiment shown in FIG. 3. FIGS. 8A to 8E show a flow chart of the routine performed by the second embodiment of the copy machine managing system according to the present invention.

Figure 8A:
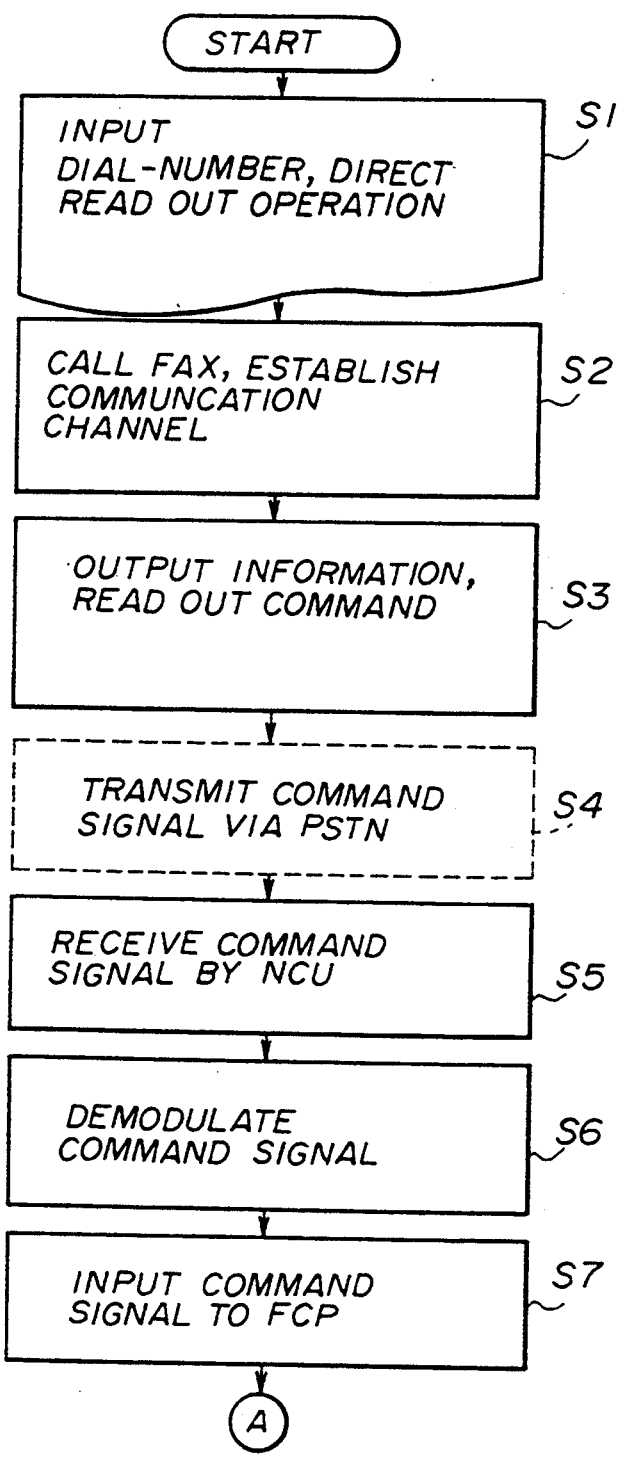
Figure 8C:
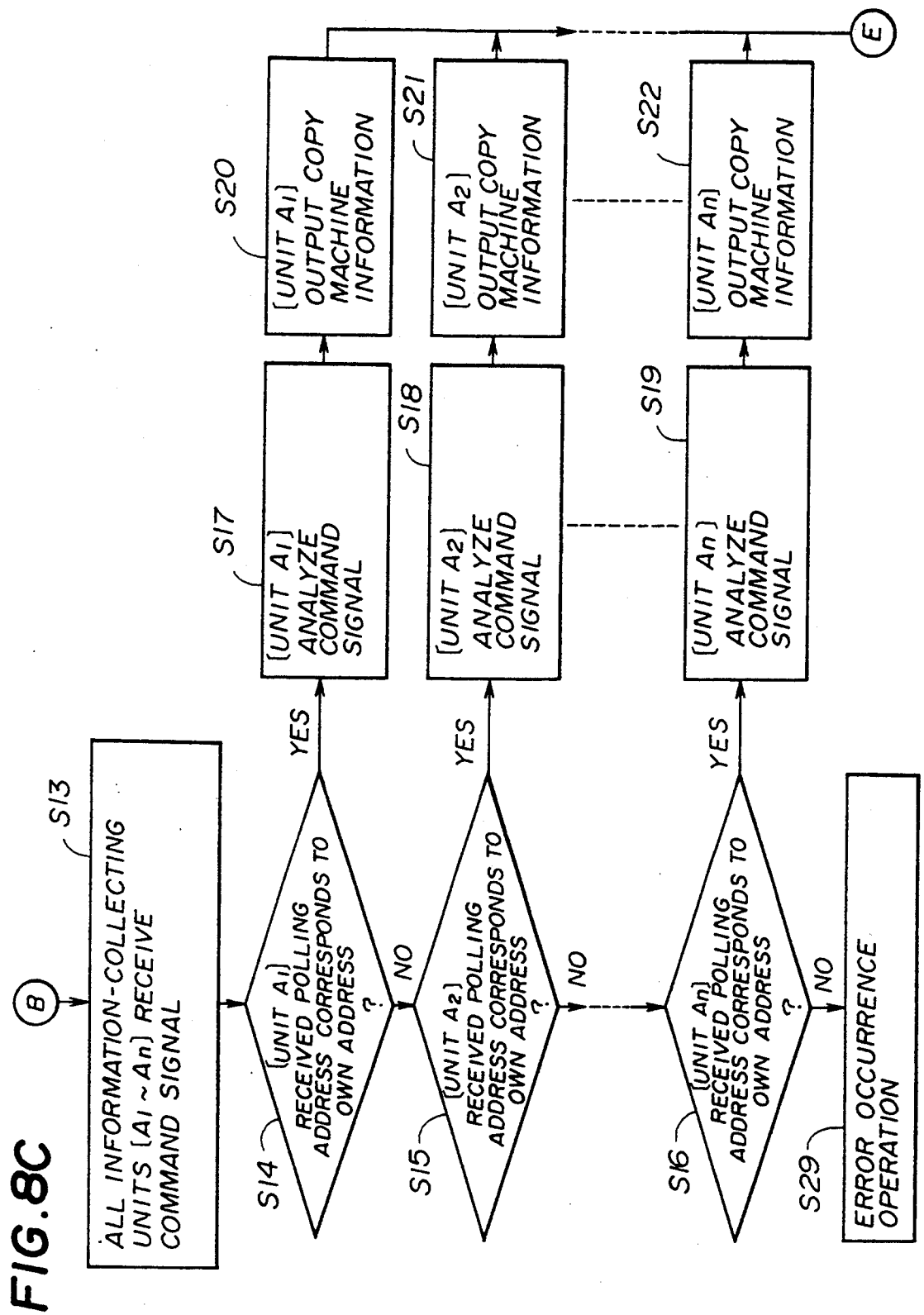
Figure 8D:
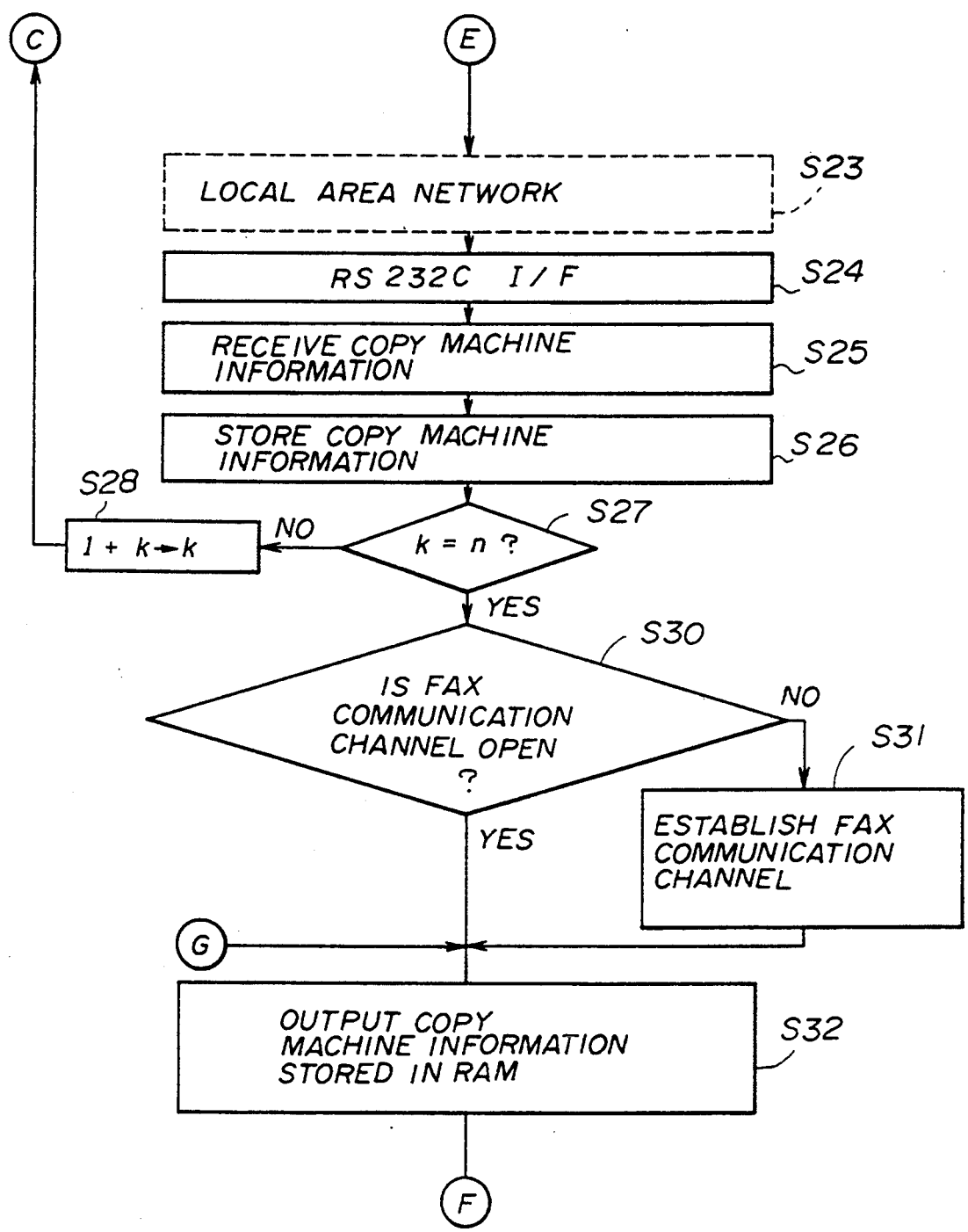

In FIG. 8A, steps S1 to S4 (hereinafter "step" is omitted) are operations performed by the central managing unit 13. In S1, an operator of the central managing unit 13 inputs a dial-number to be accessed and directs an operation for reading out the information of the copy machine 11. In S2, the central managing unit 13 calls the facsimile machine 21 by using the input dial-number and establishes a communication channel in accordance with a predetermined facsimile communication procedure. Next, in S3, the central managing unit 13 sends a command signal for reading out the management information of the copy machine 11. The command signal is transmitted, in S4, to the facsimile machine 21 via the established channel along the public service telephone line 22.

Steps S5 to S12 are operations performed in the facsimile machine 21. In S5, the command signal is received by the NCU 48 of the facsimile machine 21. The received command signal is demodulated, in S6, by the modem 47 and output to the facsimile controlling processor FCP 41. The demodulated signal is input, in S7, to the FCP 47. The FCP 47 determines, in S8, whether or not the communication channel between the central managing unit 13 and the facsimile machine 21 has to be broken. When it is determined that the channel has to be broken, the routine proceeds to S40 where the FCP 47 controls the NCU 48 so as to break the channel. Then a channel flag which indicates the breaking of the channel is stored in the ROM/RAM 42, and if it is determined in S8 that the channel does not have to be broken, the routine proceeds to S9.

Next, in S9, the FCP 47 analyzes the command signal and recognizes that the command is for read out of the management information. Then the FCP 47 outputs, in S10, a read out command signal having signals attached thereto respectively corresponding to an address of each of the copy machines 11. That is, if the facsimile machine 21 is connected with n numbers of copy machines 11, a polling address of the desired copy machine is attached to the command signal. The command signal is output, in S11, from the RS232C I/F 55 to the local area network 14. The command signal is transmitted, in S12, via the local area network 14, and all the information collection units 12 attached to each of the respective copy machines 11 receive, in S13, the command signal.

Steps S13 to S22 are performed in the information collecting unit 12. Each of copy machines $A_1$ to $A_n$ receives, in turn, the command signal and judges whether or not the polling address attached to the command signal corresponds to its own respective polling address in S14 to S16. If the polling address attached to the command signal corresponds to its own polling address, that copy machine analyzes the command signal in S17 to 19, and then the management information is output in S20 to S22.

Steps S23 to S28 are performed in the facsimile machine 21. The management information signal output from the copy machine is transmitted along the local area network 14 in S23, and entered into the facsimile machine via the RS232C I/F 55 in S24. The management information is input to the FCP 44 in S25, and then stored in the ROM/RAM 42 in S26.

In S27, it is judged whether or not a value k is equal to n. When it is judged, in S27, that a value k is less than n, the value k is incremented by 1, in S28, and then the routine returns to S10 so that steps S10 to S27 are repeated. When it is judged, in S27, that the value k is equal to n, the routine proceeds to S30.

It should be noted that if there is no copy machine whose address corresponds to the polling address attached to the command signal, the routine proceeds to S29 where an operation for an error occurrence is performed.

Next, in S30, it is judged whether or not the facsimile communication channel is still open. If the channel has been broken, the facsimile channel is opened, in S31, by means of the modem 47 and the NCU 48 and then the routine proceeds to S32 where the management information stored in the ROM/RAM 42 is output. The management information is modulated into facsimile signals, in S33, by the modem 47, and then output, in S34, by the NCU 48 in accordance with a predetermined facsimile communication procedure. The management information is transmitted, in S35, via the public service telephone line 22.

Steps S36 and S37 are operations performed in the central managing unit 13. The central managing unit 13 receives, in S36, the management information signal output by the facsimile machine 21. The received management information signal is stored in a predetermined memory area in the central managing unit 13 and output, in S37, to a display or a printer.

Next, a description will be given of a variation of the above-mentioned second embodiment. This variation has the same structure as the second embodiment of the copy machine managing system according to the present invention. In this variation, the copy machine 11 or the information collecting unit 12 is provided with a malfunction diagnosis function and an information adding function for adding malfunction diagnosis information to the management information. It is preferable for these functions to be provided for each copy machine 11 or each information collecting unit 12. However, all the copy machines or all the information collecting units 12 are not always provided with these functions because the construction of the copy machines 11 may differ from manufacturer to manufacturer. In order to deal with this situation, the copy machines having these functions are registered in the facsimile machine 21 beforehand. The ROM/RAM 42 shown in FIG. 7 is used for this registration, and an input for the registration is performed by means of the ope-port 43. The malfunction diagnosis information of the registered copy machine 11 is converted into facsimile communication signals (the image information PIX or the non-standard signals NSF or NSS shown in FIG. 4) by the facsimile machine 21, and is then transferred to the central managing unit 13 together with the management information via the public service telephone line 22.

Figure 9A:
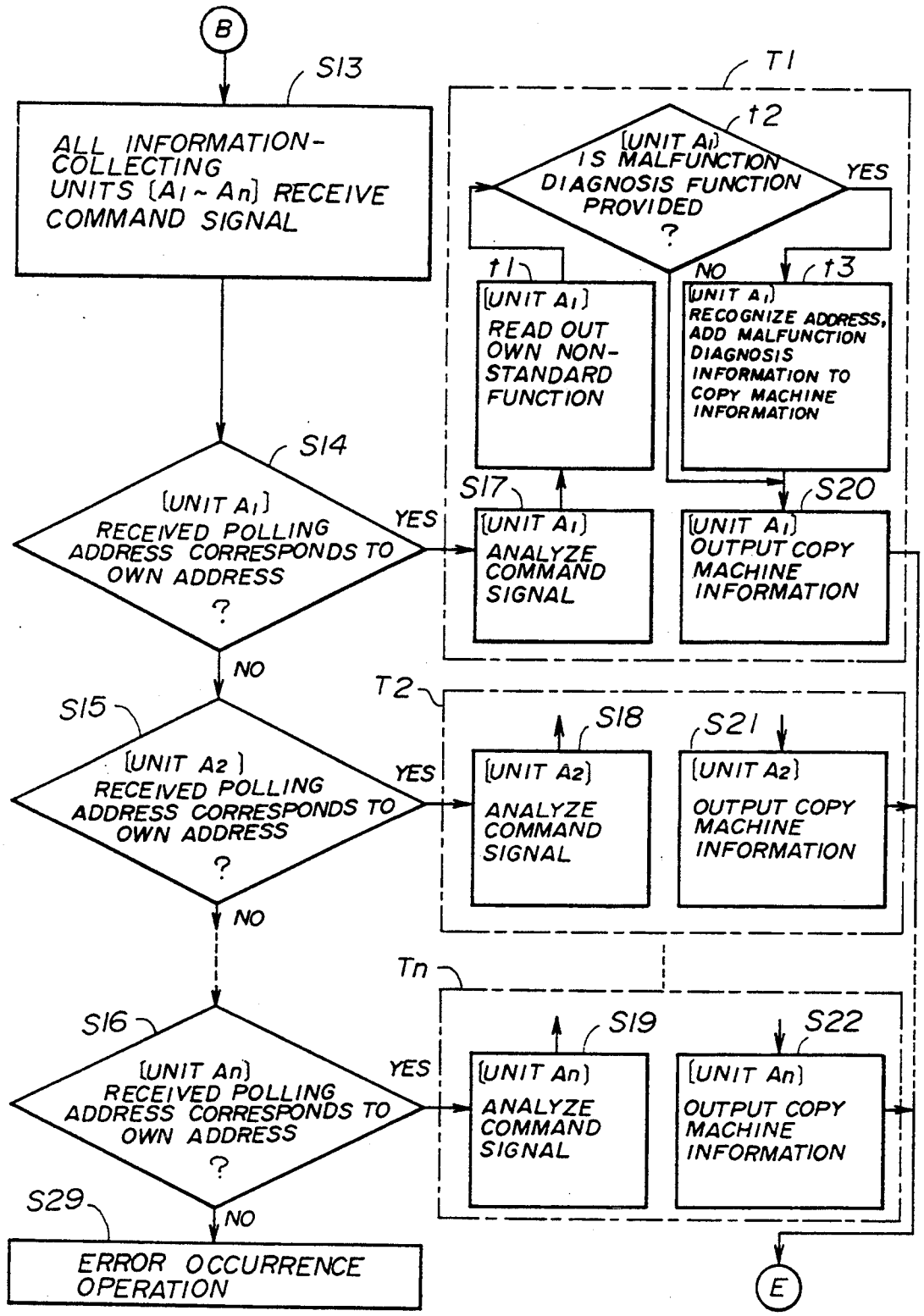
FIGS. 9A and 9B show a flow chart of an operation performed by a variation of the second embodiment.
Figure 9B:
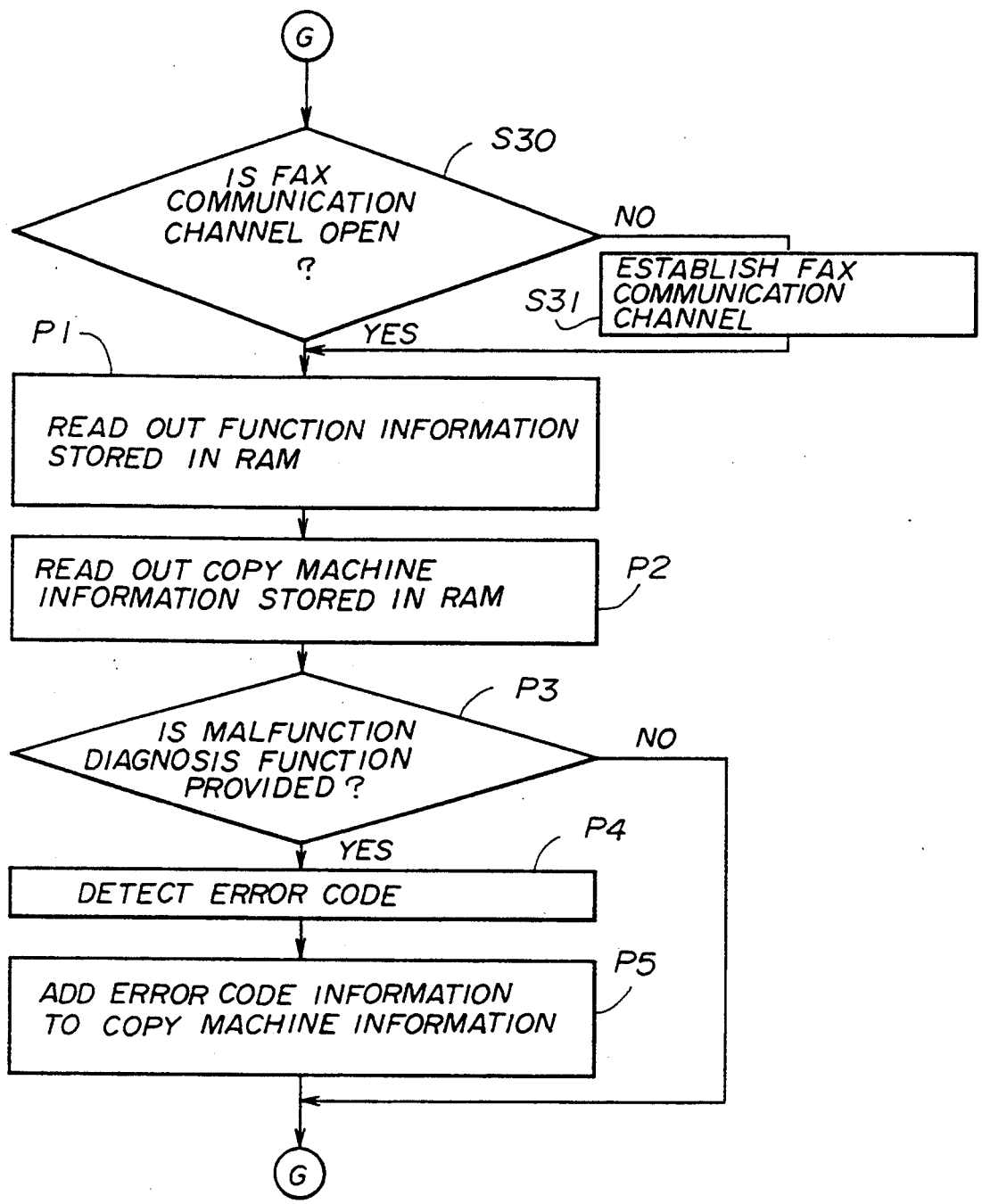

Next, a description will be given, with reference to FIGS. 9A and 9B, of an operation performed by a variation of the second embodiment. FIGS. 9A and 9B show a flow chart of the operation performed by the variation. In FIGS. 9A and 9B, steps that are the same as the steps shown in FIGS. 8 are given the same step numbers and descriptions thereof will be omitted.

The steps in FIG. 9A show read out operations performed by the copy machines $A_1$ to $A_n$ or the information collecting units 12 respectively attached to the copy machines. The flow chart in FIG. 9A is connected to that of FIG. 8C at a point indicated by a symbol B in FIG. 8C. In this flow chart, the read out operation (step $T_1$ to $T_n$) for the management information of each copy machine $A_1$ to $A_n$ is different from that shown in FIG. 8C. As the same read out operation is performed by each copy machine, a description will be given of just the operation performed by the copy machine $A_1$ and the descriptions performed by the other copy machines will be omitted.

When the copy machine $A_1$ analyzes, in S17, the command signal for a read out operation, the copy machine $A_1$ reads out, in t1, its own non-standard functions. It is then judged, in t2, whether or not the necessary functions, that is the malfunction diagnosis function and information adding function, are provided in the copy machine $A_1$. If these functions are provided, the address at which the malfunction diagnosis information is stored is recognized and the malfunction diagnosis information is added to the management information in t3. If these functions are not provided, the routine proceeds from t2 to S20 wherein the management information is output.

As mentioned above, in this variation, the malfunction diagnosis information is added, based on a judgment made by the copy machine, to the management information. However, by sending a command together with the polling signals from the facsimile machine 21, the malfunction diagnosis information may be added based on a judgment made by the facsimile machine 21. In this variation, the above-mentioned operations are performed for each of the copy machines $A_1$ to $A_n$.

Operations performed in the facsimile machine 21 when the read out operation has been performed by the copy machines $A_1$ to $A_n$ or the information collecting units 12 are shown in FIG. 9B. Steps P1 to P5 in FIG. 9B are inserted between steps S30 and S32 in FIG. 8D as indicated by a symbol G shown in FIG. 8D.

In P1, the copy-machine function information stored in the ROM/RAM 42 is read out by the FCP 41. That is, the specific copy machines having the malfunction diagnosis function are recognized in P1. Next, in P2, the copy machine information for each copy machine $A_1$ to $A_n$ is read out. Then, it is judged, in P3, whether or not each copy machine corresponding to respective copy machine information is the copy machine recognized in P1 as the specific copy machine having the malfunction diagnosis function. That is, it is judged whether or not each copy machine has a malfunction diagnosis function. When it is judged that the copy machine information has been obtained by a copy machine having a malfunction diagnosis function, the malfunction diagnosis information is detected, in P4, by using an information address, and the malfunction diagnosis information is read out and added, in P5, to the management information. If it is judged, in P3, that the copy machine information has been obtained by a copy machine having no malfunction diagnosis function, the routine proceeds to S32 where only the management information is output.

According to the above mentioned operations performed by this variation, the central managing unit 13 can obtain information with regard to malfunctions, such as the number of paper jams per unit number of papers or the location of a paper jam, in addition to the ordinary management information, for each copy machine. This malfunction diagnosis information is useful for judging whether maintenance services are needed. Accordingly, in this variation, the malfunction diagnosis information is transferred, as facsimile communication signals, to the central managing unit, and thus, the number of items that can be managed is increased and a quick response to a malfunction of the copy machine can be realized.

Next, a description will be given of another variation of the above-mentioned embodiments of the copy machine managing system, with reference to the structure of the second embodiment. In the previously described embodiments, the management information of the copy machine 11 is obtained by the central managing unit 13 accessing the facsimile machine 21. However, the facsimile machine 21 may access the central managing unit 13 periodically or upon request so as to transfer the management information from the facsimile machine 21 to the central managing unit 13.

Figure 10A:
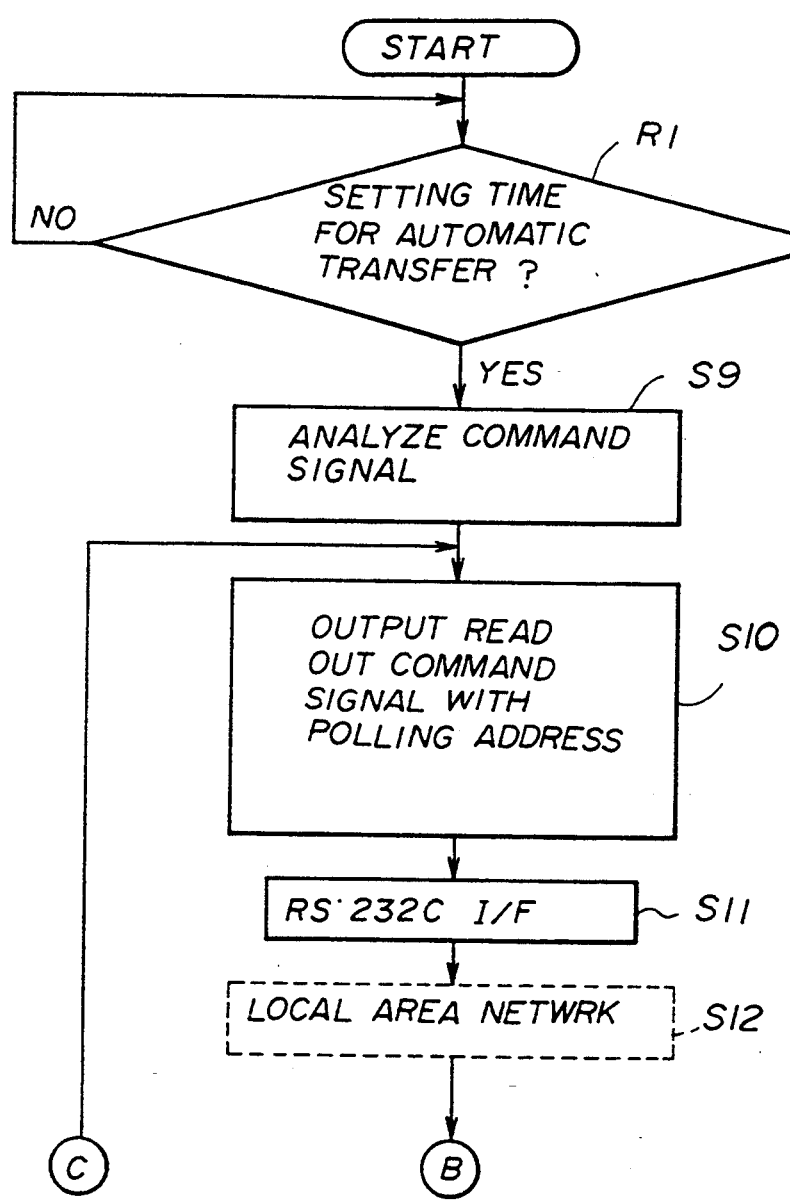

This variation is an example of a copy machine managing system provided with a periodical transfer function. FIGS. 10A and 10B show a flow chart of an operation performed in this variation of the second embodiment. In FIGS. 10A and 10B, steps that are the same as the steps shown in FIGS. 8A to 8E are given the same step numbers, and descriptions thereof will be omitted.

It should be noted that, in this variation, the central managing unit 13 is replaced by a facsimile machine.

In the flow chart shown in FIG. 10A, steps S1 to S8 shown in FIGS. 8 are replaced by step R1. In this variation, the facsimile machine 21 determines whether or not it is time to perform an automatic transfer in R1. When it is judged, in R1, that it is time to perform an automatic transfer, the facsimile machine 21 reads out the management information from the copy machines $A_1$ to $A_n$ by performing steps after S9. The time for performing the automatic transfer is set by a program stored in the ROM/RAM 42 shown in FIG. 7, and the setting time can be changed by a user or a maintenance person. Additionally, transfer of the information can be started at any time by inputting a command signal through the ope-port 43.

After performing step R1, the routine follows S9 to S32 shown in FIGS. SA to BE. After performing step S32, the routine follows the steps shown in FIG. 10B. After the facsimile machine 21 read out, in S32, the management information from the copy machines $A_1$ to $A_n$, the management information data is compressed, in Q1, by the DCR 46. Then the information data is modulated, in S33, by the modem 47 and is output, in S34, from the NCU 48 in accordance with a predetermined facsimile communication procedure. The management information data is transmitted, in S35, through the public service telephone line 22.

Steps Q2 to Q7 are performed in the facsimile machine located in the center side, instead of in the central managing unit 13. The facsimile machine located in the center side has a construction similar to that of the facsimile machine 21 shown in FIG. 7. After receiving the management information, in Q2, from the NCU (48), the information data is demodulated, in Q3, by the modem (47). The demodulated information data is regenerated, in Q4, by the DCR (46), and then the information data is stored, in Q5, in a predetermined page memory (53). Then a laser driving signal is supplied, in Q6, to an LDDR (51) in accordance with the stored information data, and a plotter performs a printing in Q7.

In the above-mentioned variation, the facsimile machine 21 reads out the management information of each copy machine. When a malfunction has occurred in the copy machine, the copy machine may notify the facsimile machine 21 of the malfunction at the time the malfunction has occurred so that the facsimile machine 21 can send a malfunction occurrence signal to the center side facsimile in realtime.

It should be noted that in the case where the central managing unit 13 is used, as in the embodiments shown in FIGS. 2, 3, 5 and 6, compression and regeneration of data similar to that occurring in the above variation are performed in the facsimile machine 21 and the central managing unit 13.

The present invention is not limited to the specifically disclosed embodiments, and variations and modifications may be made without departing from the scope of the present invention.

What is claimed is:

1. A copy machine managing system comprising:
   at least one first copy machine provided with a first collecting means for collecting and storing management information and a first transferring means for transferring said management information to an external unit, said management information being used for managing said first copy machine;
   a first facsimile machine connected with said first copy machine so as to establish a local area network, said first facsimile machine collecting said management information of said first copy machine via said local area network; and
   a managing unit connected with said first facsimile machine via a public service telephone line, said managing unit receiving said management information from said first facsimile machine via said public service telephone line,
   said management information being converted into facsimile communication signals by said first facsimile machine so that the management information is transmitted via said public service telephone line.

2. The copy machine managing system as claimed in claim 1, wherein said first facsimile machine converts said management information into image signals used for facsimile communication.

3. The copy machine managing system as claimed in claim 1, wherein said first collecting means and said first transferring means are provided as separate units which are not integral with said first copy machine.

4. The copy machine managing system as claimed in claim 1, further comprising a local managing unit provided between said first facsimile machine and said first copy machine, said local managing unit collecting said management information from said first copy machine and transferring said management information to said first facsimile machine.

5. The copy machine managing system as claimed in claim 1, further comprising at least one second facsimile machine connected with at least one second copy machine provided with second collecting means for collecting and storing management information and a second transferring means for transferring said management information to an external unit, said second copy machine and said second facsimile machine being connected to said managing unit via said public service telephone line.

6. The copy machine managing system as claimed in claim 1, wherein said first copy machine further comprises a malfunction diagnosis means for diagnosing a malfunction occurring in said first copy machine and an information adding means for adding the malfunction diagnosis information supplied by said malfunction diagnosis means to said management information, and wherein said first facsimile machine further comprises a registration means for registering said copy machine having the malfunction diagnosis means, said malfunction diagnosis information, together with said management information, being converted into facsimile communication signals, said malfunction diagnosis information being transferred by said first facsimile machine to said managing unit via said public service telephone line.

7. A facsimile machine used in a copy machine management system comprising at least one copy machine provided with a collecting means for collecting and storing management information and a transferring means for transferring said management information to an external unit, said management information to an external unit, said management information being used for managing said copy machine, said copy machine managing system further comprising a managing unit connected with said facsimile machine via a public service telephone line, said managing unit receiving said management information from said facsimile machine via said public service telephone line, said facsimile machine being connected with said copy machine so as to establish a local area network and collect said management information of said copy machine via said local area network, said facsimile machine comprising:

a read out means for reading out said management information from said transferring means, a memory means for storing said management information at an address corresponding to each of said copy machines;

a signal converting means for converting said management information into facsimile communication signals; and a transmitting means for transmitting said management information via said public service telephone line.

8. The facsimile machine as claimed in claim 7, wherein said management information is read out by the read out means automatically.

9. The facsimile machine as claimed in claim 7, wherein said management information is read out by the read out means upon a request by an operator.

10. The facsimile machine as claimed in claim 7, further comprising an outputting means for outputting said management information to a display on said facsimile machine so that said management information is displayed on said display.

11. The facsimile machine as claimed in claim 10, wherein the display comprises a printer.

12. The facsimile machine as claimed in claim 7, further comprising a parameter setting means for setting a parameter used in a software unit of said copy machine so that functions of said copy machine are changed by operating said parameter setting means.

* * * * *